Dec. 25, 1951    P. N. PAUS    2,580,042
ORTHODONTIC APPARATUS
Filed Sept. 24, 1949
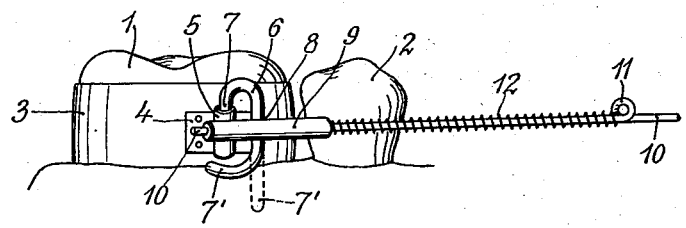
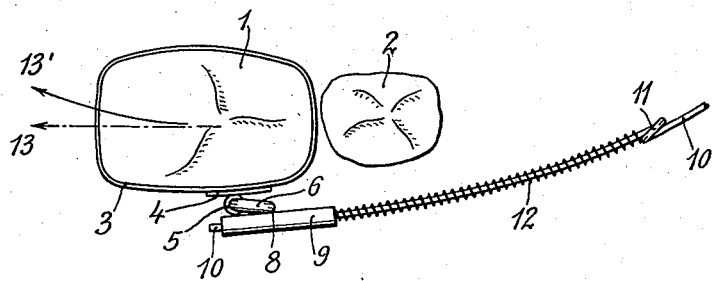
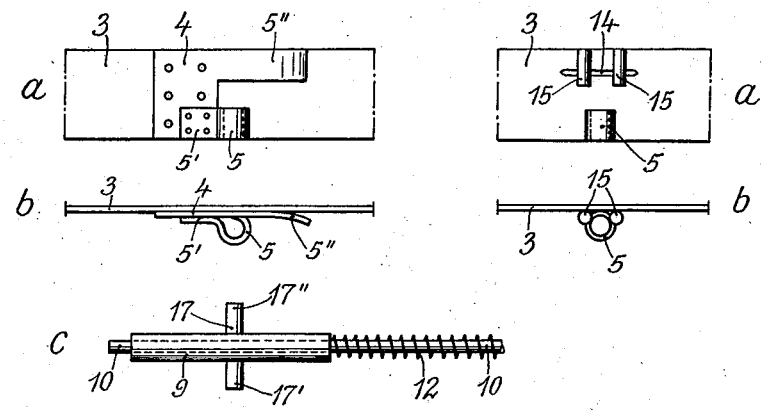
INVENTOR:
POVEL N. PAUS
By: Haseltine, Lake & Co.
AGENTS Patented Dec. 25, 1951

2,580,042

UNITED STATES PATENT OFFICE 2,580,042

ORTHODONTIC APPARATUS

Povel N. Paus, Rostockgarden, Drammen, Norway

Application September 24, 1949, Serial No. 117,654
In Norway January 24, 1949

3 Claims. (Cl. 32—14)

1

The present invention relates to orthodontic apparatus, that is apparatus for orthodontic work, of the type which comprises a hoop arranged along the upper or lower or both arcs of teeth and in some way connected with the teeth to be distally displaced. Of course, the hoop is also anchored to other teeth which are not to be displaced. With this type of apparatus the displacing force is produced by means of spring effect, the hoop itself having a certain springiness or being provided with a helical spring, one end of which is resting against a stop on the hoop, whereas the other end is pushing against a tube sliding on the hoop and connected with the tooth to be displaced relative to the neighbouring teeth.

Orthodontic means as described above thereby produce a distal displacement of the teeth only, but in many cases it is also necessary to make a rotation of the tooth which hitherto is to be made by other means.

The object of the present invention is to improve such orthodontic apparatus to enable them to apply not only a distally displacing force but also a rotating force when required. According to the invention I achieve this by arranging a hinge connection between the spring loaded member of the orthodontic apparatus and the tooth or teeth to be distally displaced and simultaneously rotated.

This and other features of the invention will appear from the following description of three embodiments shown in the drawing.

Fig. 1 is a side view of an apparatus according to the invention.

Fig. 2 same seen from above.

Figs. 3a, 3b and 3c details of a modified hinge connection and

Figs. 4a and 4b details of a further modification of the hinge connection.

In Figs. 1 and 2 a molar to be distally displaced and simultaneously rotated is designated by 1 and the anterior tooth in the front of said molar by 2. Around molar 1 is placed an anchor band, such as a metal ring 3 provided with a bracket 4 secured to band 3, for instance, by spot welding. Said bracket 4 is provided with a short tube having its central axis transverse to the arc of teeth. Said tube forms a female part of the hinge, the male part or pin of which is numbered 7. This pin constitutes one of the legs of a cramp or U-shaped member 6 formed by simply bending a piece of solid metal wire. The other leg of said member 6 is rigidly connected at 8 with a sleeve 9, for instance, by soldering. Said sleeve 9 is displaceable on hoop 10 which is located parallel

2 with the arc of teeth and on a suitable place provided with a stop 11 for a helical spring 12. Said spring 12 is pushed over the hoop leg and located between sleeve 9 and stop 11. In the present embodiment said stop is made by forming a loop on the hoop 10.

As will appear from Figs. 1 and 2 the connection between sleeve 9 and anchor band 3 is established by pushing the pin or leg 7 of member 9 into the tube piece 5. To lock the pin or leg 7 after same having been introduced into tube 5, the other leg 7' of same has been made longer than leg 7. Prior to the mounting said leg 7' is situated as indicated by dotted lines, and after the pin having been pushed into the tube, the end of leg 7' is bent in as shown in full lines.

The spring 12 applies a pushing force upon sleeve 9 so that same tends to move along the hoop away from stop 11. Therefore, the molar 1 is subjected to a displacing force as indicated by the dotted arrow 13. Owing to the hinge connection between molar 1 and sleeve 9 a rotation of same will simultaneously take place so that the resulting movement will be as shown by the curved arrow 13', see Fig. 2. As already mentioned, hoop 10 is in one or more places anchored to anterior teeth in the same arc not shown in the drawing.

Figs. 3a, 3b and 3c show in somewhat larger scale another way of establishing a hinge connection between anchor band 3 and tube 9.

Fig. 3a shows only a portion of band 3 as seen from the side upon the fixed part of the hinge, Fig. 3b same seen from above with the band straight, and Fig. 3c tube 9 with hinge pin 17 and the end part of the hoop leg as well as the helical spring.

Also in this case a bracket 4 is secured to the anchor band 3, for instance, by spot-welding. This bracket has a bifurcated extension forming flaps 5' and 5" made by splitting the sheet material as shown. Flap 5' is bent to form a short piece of a tube 5, its end being spot-welded to the flat portion 4. The other flap 5" is not bent in the same way as flap 5' until the hinge pin 17 is brought in position with its lower part 17' pushed into the tube piece 5, whereupon flap 5" by means of some suitable tool is bent around the upper part 17" of pin 17. Thus, the effect is the same as described in connection with Figs. 1 and 2, i. e. to establish a detachable hinge connection between sleeve 9 and anchor band 3.

A second modification of the hinge connection is shown in Figs. 4a and 4b which are similar to Figs. 3a and 3b respectively.

The short piece of a tube 5 is permanently secured to the lower part of band 3 to receive the lower part 17' of pin 17 of Fig. 3c. The support for the upper part 17" of the pin is formed by two short pieces of wire 15 which are secured to band 3, for instance, by welding after said band having been provided with a depressed groove 14 in the longitudinal direction as shown.

Having placed pin 17 (Fig. 3c) in position by introducing its lower part 17' into the tube piece 5, the upper part 17" which is now located between the wire pieces 15, is locked by threading a thin metal wire under both parts 15 along the groove 14, and then bending both ends of the wire to the front side and twisting the ends together thereby forming a flat ring enclosing both wires 15 with upper part 17' of pin 17 therebetween.

It will be evident to those skilled in the art that my invention is not limited to orthodontic apparatus in which the displacing force is applied by a helical spring arranged on the hoop which is not in itself springy. My invention may also be adapted to a springy hoop in which case leg 7' of the cramp 6 of Figs. 1 and 2 or pin 17 of Fig. 3c is directly fixed to the springy hoop.

Though I have only described and shown three embodiments of a hinge connection between the anchor band and the spring loaded hinge pin, it is evident that any other modification of such a connection serving the purpose to obtain a combined longitudinal displacement and a rotation of a tooth is covered by the following claims.

I claim:

1. An apparatus for orthodontic work, comprising in combination a rigid hoop arranged along the arc of the teeth, a sleeve slidable on an end portion of said hoop, a stop on the hoop spaced inwardly from the end portion, a helical spring arranged between said sleeve and said stop urging the sleeve away from said stop, a bracket connected with a tooth to be subjected to orthodontic work, and a hinge connection between said sleeve and said bracket so that the tooth in question is subjected to a combined displacing and rotating force, the axis of the hinge connection being parallel to the tooth axis.

2. An orthodontic apparatus as claimed in claim 1 and in which said hinge connection comprises a pin fixed to said sleeve in such a manner that said pin and sleeve together form a cross, and two flaps integral with said bracket and arranged to be bent around each end portion of said pin.

3. An orthodontic apparatus as claimed in claim 1, and in which said hinge connection comprises a pin fixed to said sleeve in such a manner that said pin and sleeve together form a cross, a short tube fixed to the bracket and forming one half of the tube part of the hinge, the other half being constituted by two solid pieces of wire fixed to the bracket with a space between them to receive one end portion of said pin, which end portion is locked to the bracket by means of a wire around said solid pieces of wire and said end portion with the ends of the wire twisted together to form a flat ring.

POVEL N. PAUS.

REFERENCES CITED

The following references are of record in the file of this patent:

UNITED STATES PATENTS

| Number | Name | Date |
|---|---|---|
| 1,005,131 | Angle et al. | Oct. 10, 1911 |
| 1,013,993 | Gough | Jan. 9, 1912 |
| 1,039,683 | Angle et al. | Oct. 1, 1912 |
| 1,347,285 | Murlless | July 20, 1920 |

OTHER REFERENCES

Taylor, Arthur T., American Journal of Orthodontics, volume 34, No. 9, September 1948; page 768.